US 12,103,097 B2

(12) United States Patent
Chollet et al.

(10) Patent No.: US 12,103,097 B2
(45) Date of Patent: Oct. 1, 2024

(54) SAW BLADE

(71) Applicant: MILWAUKEE ELECTRIC TOOL CORPORATION, Brookfield, WI (US)

(72) Inventors: Alexander A. Chollet, Milwaukee, WI (US); Austin J. Kazda, Wauwatosa, WI (US); Matthew B. Lois, Oconomowoc, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 300 days.

(21) Appl. No.: 17/837,524

(22) Filed: Jun. 10, 2022

(65) Prior Publication Data

US 2022/0402052 A1    Dec. 22, 2022

Related U.S. Application Data

(60) Provisional application No. 63/212,810, filed on Jun. 21, 2021.

(51) Int. Cl.
*B23D 61/12*    (2006.01)
(52) U.S. Cl.
CPC ......... *B23D 61/121* (2013.01); *B23D 61/128* (2013.01)
(58) Field of Classification Search
CPC .. B23D 61/121; B23D 61/128; B23D 61/122; B23D 61/12
USPC .......................................................... 83/385
See application file for complete search history.

(56) References Cited

U.S. PATENT DOCUMENTS

| 4,180,110 A * | 12/1979 | Tauscher .............. B23D 61/122 |
| | | 76/112 |
| 5,758,561 A | 6/1998 | Curtsinger et al. |
| 10,814,414 B2 | 10/2020 | Trautner et al. |
| 2012/0230788 A1 | 9/2012 | Bozic et al. |
| 2020/0180054 A1 | 6/2020 | Sanogo et al. |

(Continued)

FOREIGN PATENT DOCUMENTS

| DE | 102013204372 A1 * | 9/2014 | ............. B23D 61/12 |
| EP | 1671733 B1 | 8/2008 | |
| EP | 3663027 A1 * | 6/2020 | ........... B23D 61/021 |

OTHER PUBLICATIONS

International Search Report and Written Opinion for Application No. PCT/US2022/032999 dated Oct. 5, 2022 (10 pages).

*Primary Examiner* — Nhat Chieu Q Do
(74) *Attorney, Agent, or Firm* — Michael Best & Friedrich LLP

(57) ABSTRACT

A reciprocating saw blade includes a body including a first end portion, a second end portion opposite the first end portion, and a coupling edge extending between the first and second end portions. The body defines a longitudinal axis extending through the first and second end portions. The reciprocating saw blade also includes an attachment portion coupled to the first end portion of the body and a cutting portion coupled to the coupling edge of the body. The cutting portion includes a plurality of cutting teeth and a plurality of gullets. Moreover, the reciprocating saw blade includes a plurality of slots spaced along the cutting portion to separate the cutting portion into a plurality of cutting segments including a distal end segment adjacent the second end portion of the body. The distal end segment extends beyond the coupling edge of the body in a direction parallel to the longitudinal axis.

5 Claims, 4 Drawing Sheets

(56) References Cited

U.S. PATENT DOCUMENTS

2020/0198034 A1  6/2020  Kalomeris et al.
2020/0198035 A1  6/2020  Smith et al.

* cited by examiner

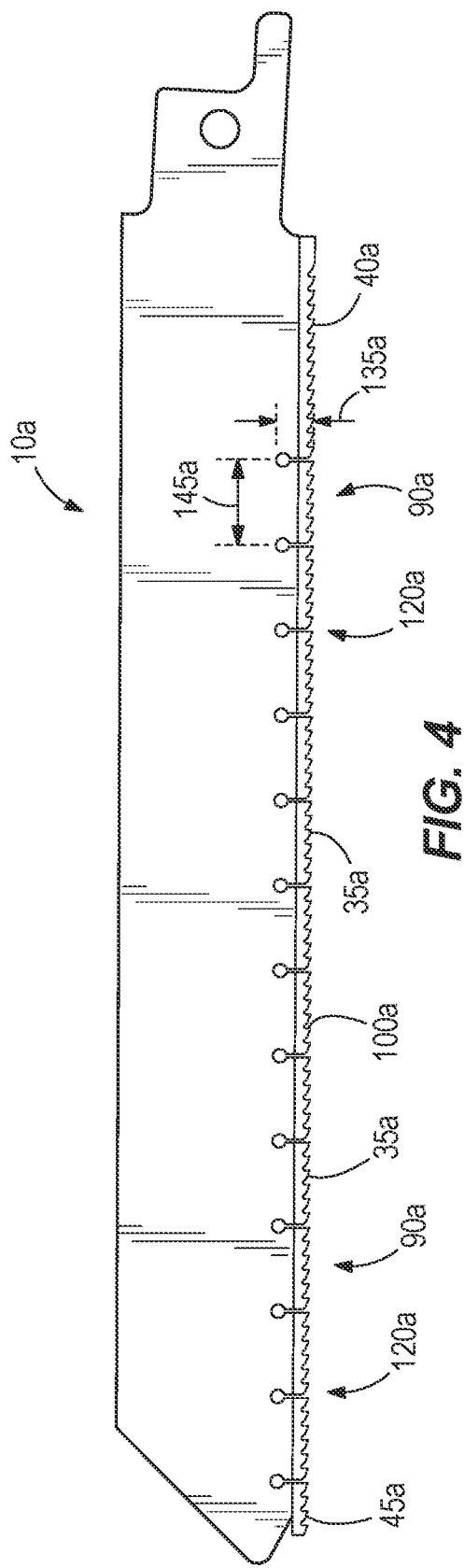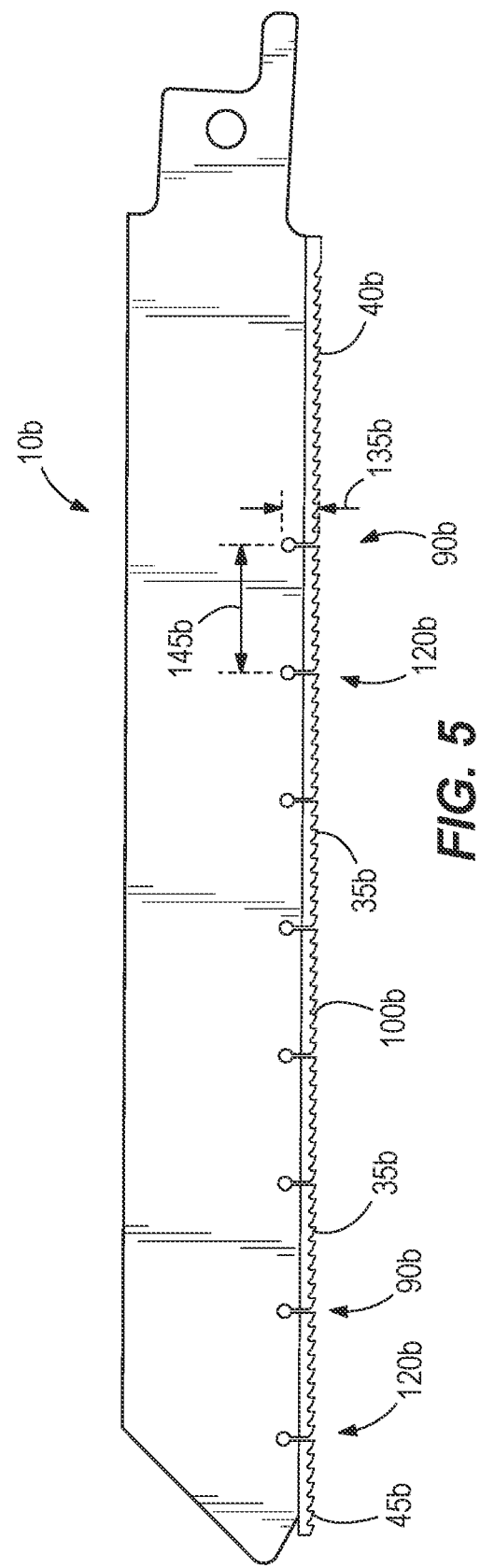

SAW BLADE

CROSS-REFERENCE TO RELATED APPLICATIONS

This application claims priority to U.S. Provisional Patent Application No. 63/212,810 filed on Jun. 21, 2021, the entire contents of which are incorporated herein by reference.

BACKGROUND

The present disclosure relates to saw blades and, more particularly, to saw blades for use with power tools.

Saw blades, such as reciprocating saw blades, are used for cutting wood, metal, plastics, and other materials. A saw blade typically includes a body, one or more attachment portions, and a cutting portion. The cutting portion comprises a plurality of teeth made up of one or more tooth forms. Tooth forms on saw blades are a major factor in the durability, cost, speed of cutting, and accuracy and quality of cuts made. Each tooth typically includes a tip, a relief face, a rake face, and a gullet. The teeth are generally separated by a pitch length (otherwise identified as the number of teeth per inch (TPI)). Some tooth forms vary along the length of the saw blade or include portions having varied teeth.

SUMMARY

In one embodiment, a reciprocating saw blade is for use with a reciprocating saw. The reciprocating saw blade includes a body including a first end portion, a second end portion opposite the first end portion, and a coupling edge extending between the first and second end portions. The body defines a longitudinal axis extending through the first and second end portions. The reciprocating saw blade also includes an attachment portion coupled to the first end portion of the body. The attachment portion includes a tang and an aperture configured to couple with the reciprocating saw. The reciprocating saw blade further includes a cutting portion coupled to the coupling edge of the body. The cutting portion includes a plurality of cutting teeth. Each cutting tooth includes a tip, a rake face, and a relief surface. The cutting portion also includes a plurality of gullets. Each gullet is positioned between a rake face of a first cutting tooth of the plurality of cutting teeth and a relief surface of an adjacent second cutting tooth of the plurality of cutting teeth. Moreover, the reciprocating saw blade includes a plurality of slots. Each slot extends through the cutting portion and the coupling edge to terminate within the body. The plurality of slots is spaced along the cutting portion to separate the cutting portion into a plurality of cutting segments including a distal end segment adjacent the second end portion of the body. The distal end segment extends beyond the coupling edge of the body in a direction parallel to the longitudinal axis.

In another embodiment, a reciprocating saw blade is for use with a reciprocating saw. The reciprocating saw blade includes a body including a first end portion, a second end portion opposite the first end portion, and a coupling edge extending between the first and second end portions. The body defines a longitudinal axis extending through the first and second end portions. The reciprocating saw blade also includes an attachment portion coupled to the first end portion of the body. The attachment portion includes a tang and an aperture configured to couple with the reciprocating saw. The reciprocating saw blade further includes a cutting portion coupled to the coupling edge of the body. The cutting portion includes a plurality of cutting teeth. Each cutting tooth includes a tip, a rake face, and a relief surface. The cutting portion also includes a plurality of gullets. Each gullet is positioned between adjacent cutting teeth. Moreover, the reciprocating saw blade includes a plurality of slots. Each slot extends through the cutting portion to terminate within the body. The plurality of slots is spaced along the cutting portion to separate the cutting portion into a plurality of cutting segments including a proximal end segment adjacent the first end portion of the body, a distal end segment adjacent the second end portion of the body, and a plurality of intermediate cutting segments positioned between the proximal end segment and the distal end segment. The proximal end segment is longer than each intermediate cutting segment.

In another embodiment, a reciprocating saw blade is for use with a reciprocating saw. The reciprocating saw blade includes a body defining a longitudinal axis and an attachment portion coupled to the body. The attachment portion includes a tang and an aperture configured to couple with the reciprocating saw. The reciprocating saw blade also includes a cutting portion coupled to the body. The cutting portion includes a plurality of cutting teeth. Each cutting tooth includes a tip, a rake face, and a relief surface. The cutting portion also includes a plurality of gullets. Each gullet is positioned between a rake face of a first cutting tooth of the plurality of cutting teeth and a relief surface of an adjacent second cutting tooth of the plurality of cutting teeth. The reciprocating saw blade further includes a plurality of slots spaced along the cutting portion to separate the cutting portion into a plurality of cutting segments. Each slot includes a first portion extending through the cutting portion and a second portion at which each slot terminates within the body. The first portion having a first maximum dimension measured parallel to the longitudinal axis and the second portion having a second maximum dimension measured parallel to the longitudinal axis. The second maximum dimension is greater than the first maximum dimension.

BRIEF DESCRIPTION OF THE DRAWINGS

FIG. 4 is a side view of a saw blade according to another embodiment.

FIG. 5 is a side view of a saw blade according to another embodiment.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and being practiced or being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described embodiments.

Figure 1:
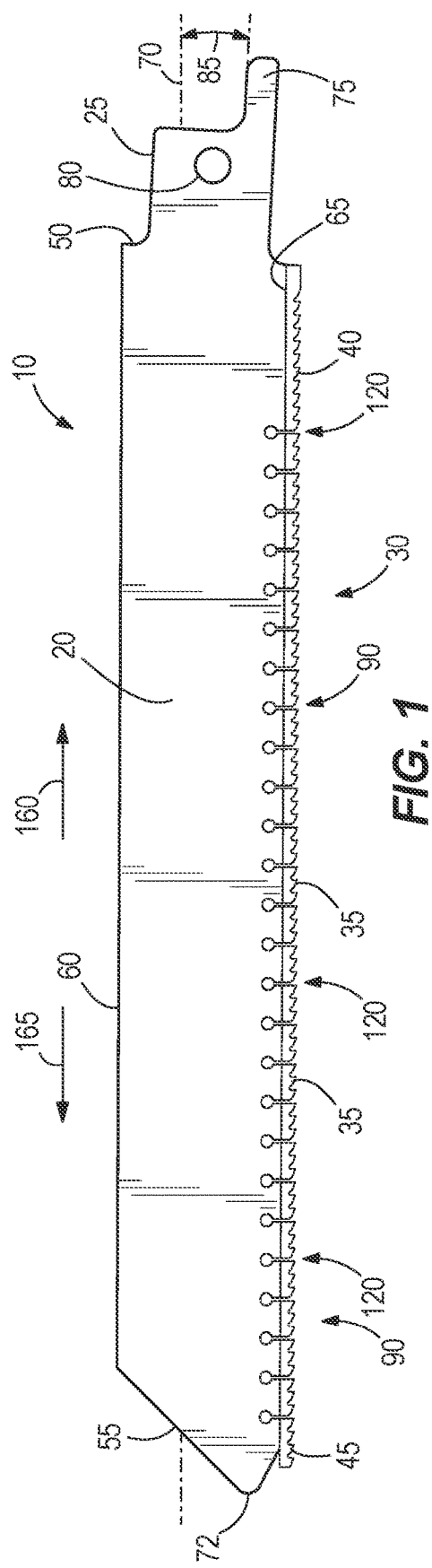
FIG. 1 is a side view of a saw blade according to one embodiment.
Figure 2:
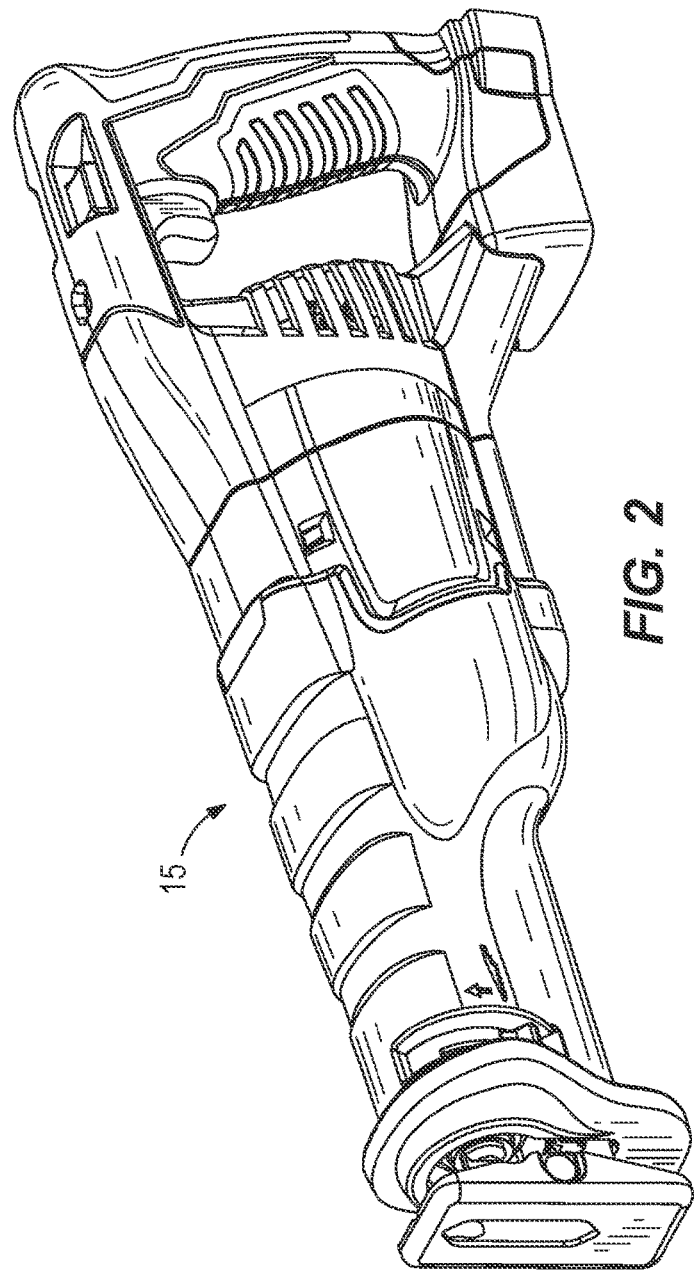
FIG. 2 is a perspective view of a power tool for use with the saw blade of FIG. 1.

FIG. 1 illustrates a saw blade 10 according to one embodiment that is selectively coupled to a power tool 15 (FIG. 2). In the illustrated embodiment, the saw blade 10 is a reciprocating saw blade, and the power tool 15 is a reciprocating saw. However, in other embodiments, the saw blade 10 can be a different type of saw blade that can be coupled to a corresponding power tool. For example, the saw blade 10 can be a band saw blade that is selectively coupled to a portable and/or stationary band saw, a jig saw blade that is selectively coupled to a jig saw, a circular saw blade that is selectively coupled to a circular saw, miter saw, or the like, a hole saw that is selectively coupled to a power drill, etc.

The illustrated saw blade 10 includes a body 20, an attachment portion 25 for coupling the saw blade 10 to the power tool 15, and a cutting portion 30 having a plurality of cutting segments 35, 40, 45. In the illustrated embodiment, the body 20 and the attachment portion 25 are integrally formed as a single piece to form a unitary structure. In other embodiments, the body 20 and the attachment portion 25 may be separate pieces that are secured together. The body 20 includes a first end portion 50 and a second end portion 55 (e.g., a distal edge). The attachment portion 25 is coupled to (e.g., formed at, welded to, etc.) the first end portion 50 of the body 20. A back portion 60 extends between the attachment portion 25 and the second end portion 55 opposite a coupling edge 65 of the body 20. The body 20 also defines a longitudinal axis 70 extending between the first end portion 50 and the second end portion 55. A nose 72 of the body 20 is defined along the second end portion 55 to form a tip of the saw blade 10. The body 20 further defines a cutback 73 that extends from the nose 72 towards the coupling edge 65. In the illustrated embodiment, the body 20 includes a thickness perpendicular to the longitudinal axis 70 between opposite sides of the body 20. The thickness is between about 0.03 inches and about 0.05 inches (e.g., about 0.035 inches). The body 20 also includes a height perpendicular to the longitudinal axis 70 between the back portion 60 and the cutting portion 30. The height is between about 0.6 inches and about 0.8 inches (e.g., about 0.75 inches).

The attachment portion 25 extends from the first end portion 50 of the body 20 and includes a tang 75 and an aperture 80. The tang 75 and the aperture 80 are configured to engage a blade clamp of the power tool 15 to securely and releasably couple the saw blade 10 to the power tool 15. The illustrated tang 75 is angled relative to the longitudinal axis 70 by a tang angle 85. In the illustrated embodiment, the tang angle 85 is approximately 3 degrees. In other embodiments, the tang angle 85 can be between about 2 degrees and about 7 degrees. In further embodiments, the tang angle 85 can be less than 2 degrees or greater than 7 degrees.

Figure 3:
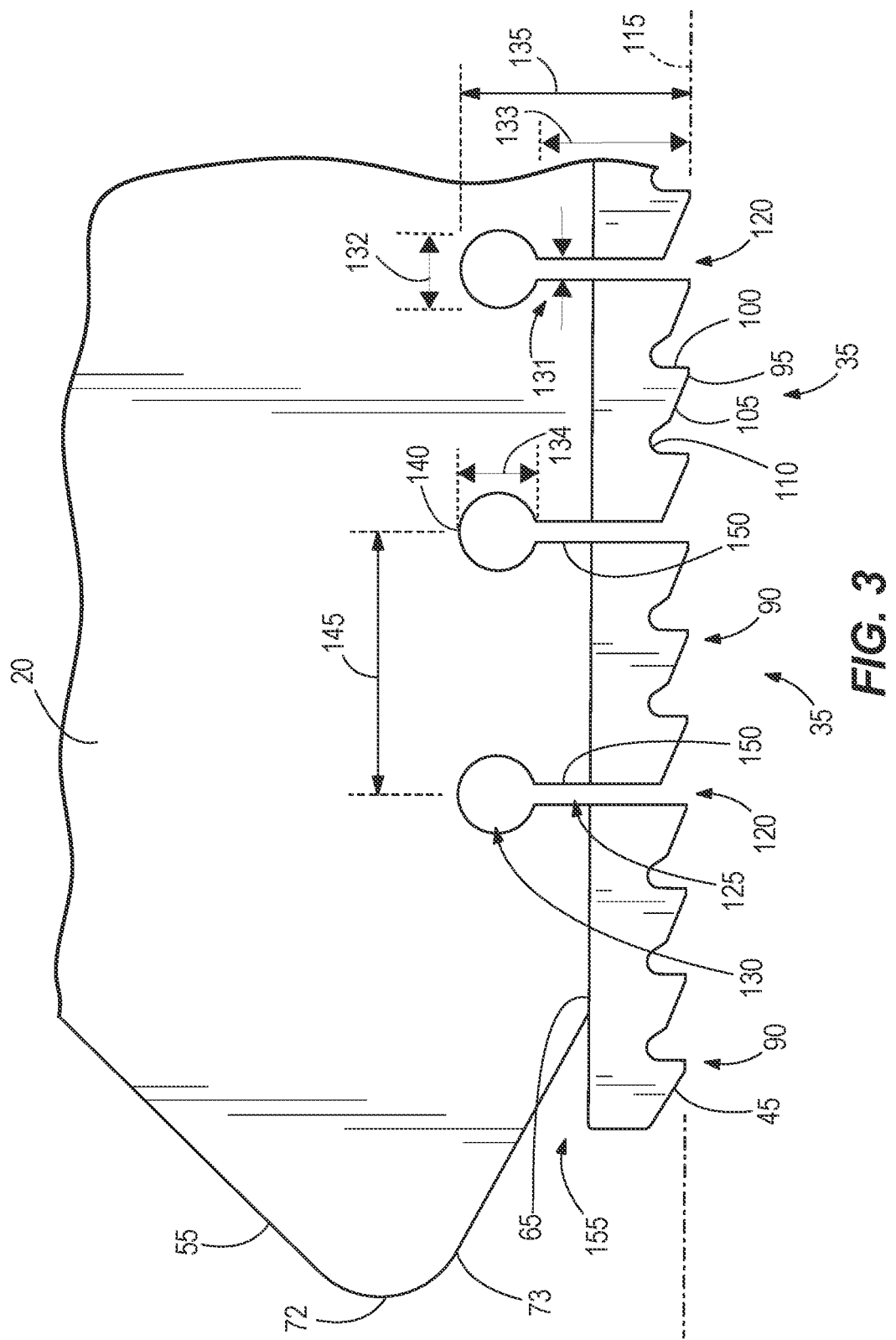
FIG. 3 is a detailed view of a portion of the saw blade of FIG. 1.

The illustrated cutting segments 35, 40, 45 include cutting teeth 90 that collectively define a tooth form on the body 20. As best shown in FIG. 3, each cutting tooth 90 includes a tip 95, a rake face 100 extending from the tip 95 generally toward the longitudinal axis 70, and a relief surface 105 extending from the tip 95 generally toward an adjacent cutting tooth 90. The tooth form also includes gullets 110 each formed between adjacent cutting teeth 90. As such, each gullet 110 extends between a rake face 100 of a first cutting tooth 90 and a relief surface 105 of an adjacent second cutting tooth 90.

With continued reference to FIG. 3, the tips 95 of the cutting teeth 90 define a plane 115 that is parallel to the longitudinal axis 70 of the body 20. In some embodiments, only some of the cutting teeth 90 may define the plane 115. For example, the cutting teeth 90 may have different heights. Each rake face 100 extends from the corresponding tip 95 at a rake angle relative to the plane 115. The rake angle of each cutting tooth 90 is a positive rake angle. In the illustrated embodiment, the rake angle of each cutting tooth 90 is between about 89 degrees and about 83 degrees (measured through the cutting tooth 90). In other embodiments, the rake angle can be between 90 degrees and 89 degrees or smaller than 83 degrees, or each rake face 100 can extend at a negative rake angle (e.g., greater than 90 degrees relative to the plane 115). In some embodiments, the rake angles of the cutting teeth 90 may be different from each other or may vary along the length of the saw blade 10. The relief surfaces 105 are oriented at relief angles relative to the plane 115. In the illustrated embodiment, the relief angle of each cutting tooth 90 is between about 20 degrees and about 28 degrees (e.g., about 24 degrees). In other embodiments, the relief angles can be larger than 28 degrees or smaller than 20 degrees. In some embodiments, the relief angles of the cutting teeth 90 may be different from each other or may vary along the length of the saw blade 10.

The illustrated tooth form includes 18 teeth per inch (TPI) such that adjacent cutting teeth 90 are separated by a pitch of 0.055 inches. In other embodiments, the saw blade 10 can include fewer or more teeth per inch. For example, the tooth form may include 10 TPI, 15 TPI, 20 TPI or the like. In the illustrated embodiment, the cutting teeth 90 are unset such that the cutting teeth 90 extend straight from the body 20. In other embodiments, some or all of the cutting teeth 90 can be bent or "set" at various angles relative to a hypothetical plane defined by the body 20. The distances and angles identified herein refer to a saw blade in which the cutting teeth are unset. However, it should be readily apparent that a saw blade can be designed according to the disclosed dimensions with unset cutting teeth, and the cutting teeth may ultimately be set as desired during manufacture.

With reference to FIGS. 1 and 3, the saw blade 10 also includes a plurality of slots 120 (e.g., 26 separate slots in total) extending through the cutting portion 30, the coupling edge 65, and into the body 20. In other embodiments, the saw blade 10 can include more or fewer than 26 slots 120 as discussed further below. Each illustrated slot 120 separates adjacent cutting segments 35, 40, 45, such that each cutting segment 35, 40, 45 includes more than one cutting tooth 90 and more than one gullet 110. In particular, the illustrated slots 120 are spaced apart in a direction along the longitudinal axis 70 such that each intermediate cutting segment 35 includes three rake faces 100. As best shown in FIG. 3, each slot 120 extends through (e.g., begins at) a gullet 110 and terminates within the body 20. Each slot 120 includes a first portion 125 (e.g., a straight portion) that extends through the cutting portion 30, the coupling edge 65, and a portion of the body 20, and includes a second portion 130 (e.g., non-linear portion) in which the slot 120 terminates at. In the illustrated embodiment, the first and second portions 125, 130 are oriented substantially perpendicular to the longitudinal axis 70 of the body 20. In other embodiments, the first portion 125 and/or the second portion 130 can be obliquely oriented relative to the longitudinal axis 70. The illustrated second portion 130 is substantially circular (includes a constant radius). In other embodiments, the second portion 130 can be differently configured (e.g., an oval-shaped portion, hex-shaped portion, triangle-shaped portion, square-shaped portion, etc.). In further embodiments, the first and second portions 125, 130 can form a continuous geometry (e.g., an oval, tear-drop shape, etc.).

The first portion 125 has a first maximum dimension 131 and the second portion 130 has a second maximum dimension 132, in which the first and second maximum dimensions 131, 132 are measured parallel to the longitudinal axis 70. The first maximum dimension 131 may also be referred to as a width of the first portion 125, and the second maximum dimension 132 may also be referred to as a diameter of the second portion 130. The second maximum dimension 132 is greater than the first maximum dimension 131. In the illustrated embodiment, a ratio of the first maximum dimension 131 to the second maximum dimension 132 is between about 0.15 and about 0.50. The first portion 125 also has a third maximum dimension 133, while the second portion 130 also has a fourth maximum dimension 134. The third and fourth maximum dimensions 133, 134 are measured perpendicular to the longitudinal axis 70. The third maximum dimension 133 is measured from the tip 95 of the cutting teeth 90 to the second portion 130. The third maximum dimension 133 may also be referred to as a length of the first portion 125, and the fourth maximum dimension 134 may also be referred to as the diameter of the second portion 130. Because the second portion 130 is circular, the second maximum dimension 131 is equal to the fourth maximum dimension 134 in the illustrated embodiment. The fourth maximum dimensions 134 is less than the third maximum dimension 133. In the illustrated embodiment, a ratio of the third maximum dimension 133 to the fourth maximum dimension 134 is between about 1.60 and about 2.10.

As shown in FIG. 3, the slots 120 include a length 135, measured from the plane 115 to a distal end point 140 of the second portion 130, perpendicular to the longitudinal axis 70 of the body 20. The illustrated length 135 of each slot 120 is between about 0.094 inches and about 0.187 inches. In addition, each intermediate cutting segment 35 includes a width 145, measured between side edges 150 of the intermediate cutting segment 35, parallel to the longitudinal axis 70. The illustrated width 145 is between about 0.125 inches and about 0.187 inches. Accordingly, a ratio of the length 135 to the width 145 is between about 0.5 and about 1.5.

With reference back to FIG. 1, the proximal end segment 40 between the attachment portion 25 and the slot 120 closest to the attachment portion 25 is longer than each individual intermediate cutting segment 35. The proximal end segment 40 is also longer than the distal end segment 45. As such, the proximal end segment 40 includes more cutting teeth 90 than each individual intermediate cutting segment 35 and than the distal end segment 45. In the illustrated embodiment, each intermediate cutting segment 35 has generally the same length and is longer than the distal end segment 45. As such, each intermediate cutting segment 35 also includes more cutting teeth 90 than the distal end segment 45. In other embodiments, the intermediate cutting segments 35 and the distal end segment 45 may have generally the same lengths, or the distal end segment 45 may be longer than the intermediate cutting segments 35.

In addition, the distal end segment 45 extends beyond the coupling edge 65, but not beyond the nose 72 of the body 20, such that a gap 155 (FIG. 3) is formed between the distal end segment 45 and the second end portion 55 of the body 20. The distal end segment 45 is longer than each individual intermediate cutting segment 35 and includes more cutting teeth 90 than each individual intermediate cutting segment 35. In the illustrated embodiment, at least one cutting tooth 90 of the distal end segment 45 is positioned beyond the coupling edge 65, but not beyond the nose 72 of the body 20, in a direction parallel to the longitudinal axis 70. In other embodiments, more than one cutting tooth 90 of the distal end segment 45 can be positioned beyond the coupling edge 65. In further embodiments, the distal end segment 45 can terminate at an end of the coupling edge 65 to not extend beyond the coupling edge 65.

During manufacturing of the saw blade 10, the unitary structure of the body 20 and the attachment portion 25 is formed from a first material (e.g., low-carbon steel) by, for example, a stamping process. The illustrated cutting segments 35, 40, 45 are formed from a second material (e.g., carbide) that includes a higher hardness than the first material of the body 20. In one embodiment, a single carbide strip can be secured to the coupling edge 65 of the body 20, and then the slots 120 can be formed in the carbide strip and the body 20 (e.g., by a stamping process or the like) to form the cutting segments 35, 40, 45. The cutting teeth 90 are formed in the carbide strip before carbide strip is secured to the coupling edge 65. In other embodiments, the cutting teeth 90 can be formed in each cutting segment 35, 40, 45 after the carbide strip is secured to the body 20. In further embodiments, the cutting teeth 90 can be formed before or after the slots 120 are formed on the saw blade 10. In yet further embodiments, the slots 120 are formed in the body 20, and then individual carbides are secured to the body 20 to form the cutting segments 35, 40, 45. The cutting teeth 90 can be formed in the individual carbides before or after the carbides are secured to the body 20.

In other embodiments, the cutting segments 35, 40, 45 can be formed from a metal (e.g., high speed steel) that includes a higher hardness than the first material (low-carbon steel) of the body 20 and can be secured (e.g., welding, brazing, or the like) to the coupling edge 65. In further embodiments, the cutting segments 35, 40, 45 and the body 20 can be integrally formed as a single piece to form a unitary structure (e.g., formed from the same material). In yet further embodiments, the cutting segments 35, 40, 45 and the body 20 can be integrally formed and the cutting segments 35, 40, 45 can undergo a process (e.g., cold working, heat treating, etc.) to increase their hardness relative to the body 20.

During operation, the saw blade 10 is reciprocated in a cutting direction 160 and a return direction 165 (FIG. 1) by the power tool 15 to cut through a workpiece. Specifically, the cutting segments 35, 40, 45 are configured to efficiently cut through a metal workpiece (e.g., stainless steel, steel, etc.). The saw blade 10 including the illustrated slots 120 can increase the life of the saw blade 10 (e.g., number of cuts through a workpiece prior to failure) compared to conventional saw blades when cutting through certain workpieces (e.g., steel). In some scenarios, the cutting segments 35, 40, 45 allow the saw blade 10 to bend or deflect without cracking, for example, the carbide strip that forms the cutting teeth 90, compared to a saw blade with a single, continuous rail of carbide along its cutting edge. In addition, in some situations, the saw blade 10 can include an increase in cutting performance (e.g., speed at which the saw blade 10 cuts through a workpiece) compared to conventional saw blades. Furthermore, the slots 120 can at least partially function as gullets to aid in chip removal between the saw blade 10 and the workpiece during operation.

FIG. 4 illustrates a saw blade 10a according to another embodiment. The saw blade 10a is similar to the saw blade 10; therefore, similar components are designated with similar references numbers each including the letter "a." At least some differences and/or at least some similarities between the saw blades 10, 10a will be discussed in detail below.

The saw blade 10a includes fewer slots 120a than the saw blade 10 such that each intermediate cutting segment 35a is longer than the intermediate cutting segments 35. In the illustrated embodiment, the saw blade 10a includes a total of 13 slots 120a, and each intermediate cutting segment 35a includes six rake faces 100a. In addition, a proximal end segment 40a is longer than each individual intermediate cutting segment 35a and includes more cutting teeth 90a than each individual intermediate cutting segment 35a. However, a distal end segment 45a is shorter than each individual intermediate cutting segment 35a and includes fewer cutting teeth 90a than each individual intermediate cutting segment 35a.

Each illustrated slot 120a includes a length 135a between about 0.094 inches and about 0.187 inches. In addition, each intermediate cutting segment 35a includes a width 145a between about 0.312 inches and about 0.375 inches. Accordingly, a ratio of the length 135a to the width 145a is between about 0.25 and about 0.6.

The illustrated saw blade 10a including the illustrated slots 120a can increase the life of the saw blade 10a (e.g., number of cuts through a workpiece prior to failure) compared to conventional saw blades when cutting through certain workpieces (e.g., steel). In addition, in some situations, the saw blade 10a can include an increase in cutting performance (e.g., speed at which the saw blade 10a cuts through a workpiece) compared to conventional saw blades.

FIG. 5 illustrates a saw blade 10b according to another embodiment. The saw blade 10b is similar to the saw blade 10; therefore, similar components are designated with similar references numbers each including the letter "b." At least some differences and/or at least some similarities between the saw blades 10, 10b will be discussed in detail below.

The saw blade 10b includes fewer slots 120b than the saw blades 10, 10a such that each intermediate cutting segment 35b is longer than the intermediate cutting segments 35, 35a. In the illustrated embodiment, the saw blade 10b includes a total of eight slots 120b, and each intermediate cutting segment 35b includes nine rake faces 100b. In addition, a proximal end segment 40b is longer than each individual intermediate cutting segment 35b and includes more cutting teeth 90b than each individual intermediate cutting segment 35b. A distal end segment 45b is shorter than each individual intermediate cutting segment 35b and includes fewer cutting teeth 90b than each individual intermediate cutting segment 35b.

Each illustrated slot 120b includes a length 135b between about 0.094 inches and about 0.187 inches. In addition, each intermediate cutting segment 35b includes a width 145b between about 0.437 inches and about 0.562 inches. Accordingly, a ratio of the length 135b to the width 145b is between about 0.16 and about 0.43.

The illustrated saw blade 10b including the illustrated slots 120b can increase the life of the saw blade 10b (e.g., number of cuts through a workpiece prior to failure) compared to conventional saw blades when cutting through certain workpieces (e.g., steel). In addition, in some situations, the saw blade 10b can include an increase in cutting performance (e.g., speed at which the saw blade 10b cuts through a workpiece) compared to conventional saw blades.

Figure 6:
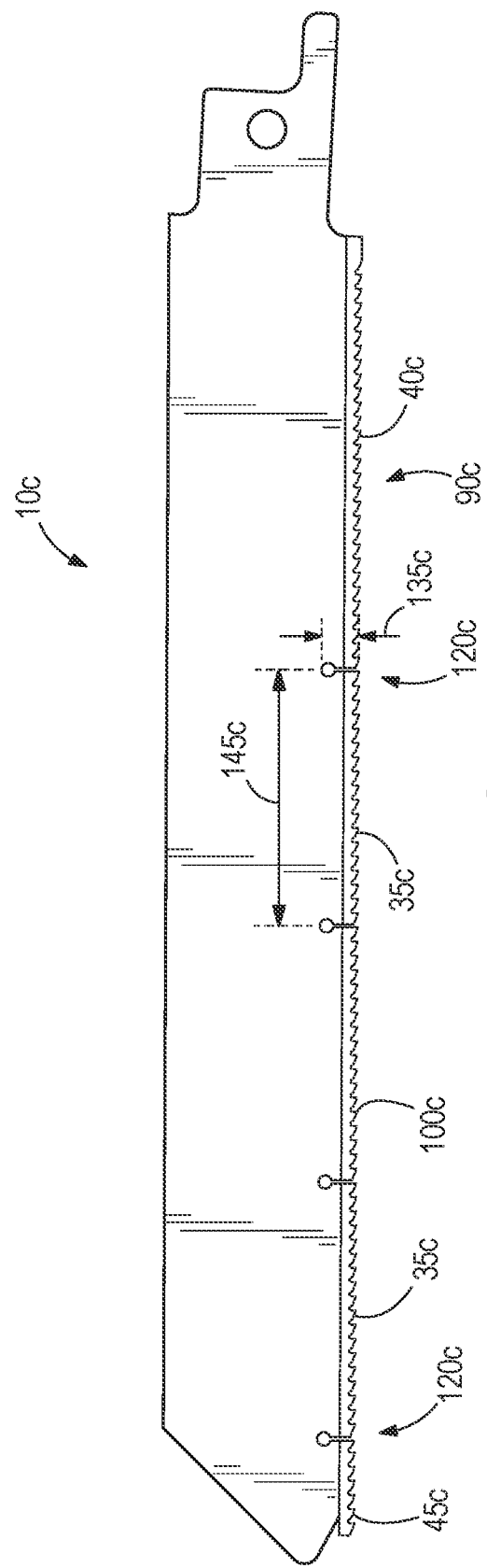
FIG. 6 is a side view of a saw blade according to another embodiment.

FIG. 6 illustrates a saw blade 10c according to another embodiment. The saw blade 10c is similar to the saw blade 10; therefore, similar components are designated with similar references numbers each including the letter "c." At least some differences and/or at least some similarities between the saw blades 10, 10c will be discussed in detail below.

The saw blade 10c includes fewer slots 120c than the saw blades 10, 10a, 10b such that each intermediate cutting segment 35c is longer than the intermediate cutting segments 35, 35a, 35b. In the illustrated embodiment, the saw blade 10c includes a total of four slots 120c, and each intermediate cutting segment 35c includes 18 rake faces 100c. In addition, a proximal end segment 40c is longer than each individual intermediate cutting segment 35c and includes more cutting teeth 90c than each individual intermediate cutting segment 35c. A distal end segment 45c is shorter than each individual intermediate cutting segment 35c and includes fewer cutting teeth 90c than each individual intermediate cutting segment 35c.

Each illustrated slot 120c includes a length 135c between about 0.094 inches and about 0.187 inches. In addition, each intermediate cutting segment 35c includes a width 145c between about 0.937 inches and about 1.062 inches. Accordingly, a ratio of the length 135c to the width 145c is between about 0.09 and about 0.2.

The illustrated saw blade 10c including the illustrated slots 120c can increase the life of the saw blade 10c (e.g., number of cuts through a workpiece prior to failure) compared to conventional saw blades when cutting through certain workpieces (e.g., stainless steel or steel). In addition, in some situations, the saw blade 10c can include an increase in cutting performance (e.g., speed at which the saw blade 10c cuts through a workpiece) compared to conventional saw blades.

In sum, the saw blades 10, 10a, 10b, 10c can include any number of slots 120, 120a, 120b, 120c to include any number of cutting teeth 90, 90a, 90b, 90c on the cutting segments 35, 35a, 35b, 35c. Although the disclosure has been described in detail with reference to certain preferred embodiments, variations and modifications exist within the scope and spirit of one or more independent aspects of the disclosure as described. Various features and advantages of the disclosure are set forth in the following claims.

What is claimed is:

1. A reciprocating saw blade for use with a reciprocating saw, the reciprocating saw blade comprising:
   a body including a first end portion, a second end portion opposite the first end portion, and a coupling edge extending between the first and second end portions, the body defining a longitudinal axis extending through the first and second end portions;
   an attachment portion coupled to the first end portion of the body, the attachment portion including a tang and an aperture configured to couple with the reciprocating saw;
   a cutting portion coupled to the coupling edge of the body, the cutting portion including
   a plurality of cutting teeth, each cutting tooth including a tip, a rake face, and a relief surface, and
   a plurality of gullets, each gullet positioned between a rake face of a first cutting tooth of the plurality of cutting teeth and a relief surface of an adjacent second cutting tooth of the plurality of cutting teeth; and
   a plurality of slots, each slot extending through the cutting portion and the coupling edge to terminate within the body, the plurality of slots spaced along the cutting portion to separate the cutting portion into a plurality of cutting segments including a distal end segment adjacent the second end portion of the body,
   wherein the distal end segment extends beyond the coupling edge of the body in a direction parallel to the longitudinal axis, wherein the second end portion defines a nose of the body and includes a cutback extending from the nose toward the coupling edge, wherein a gap is defined between the distal end segment and the nose, and wherein the distal end segment does not extend beyond the nose in the direction parallel to the longitudinal axis.

2. The reciprocating saw blade of claim 1, wherein each slot is formed through a portion of a gullet of the plurality of gullets.

3. The reciprocating saw blade of claim 2, wherein each slot includes a first portion that is substantially straight and a second portion that is non-linear.

4. The reciprocating saw blade of claim 1, wherein each cutting segment includes at least three rake faces of the plurality of cutting teeth.

5. The reciprocating saw blade of claim 1, wherein the cutting portion is formed of carbide.

\* \* \* \* \*